Jan. 20, 1942.  H. T. PLATZ  2,270,767
WELDING EQUIPMENT
Filed Jan. 29, 1940  7 Sheets-Sheet 5

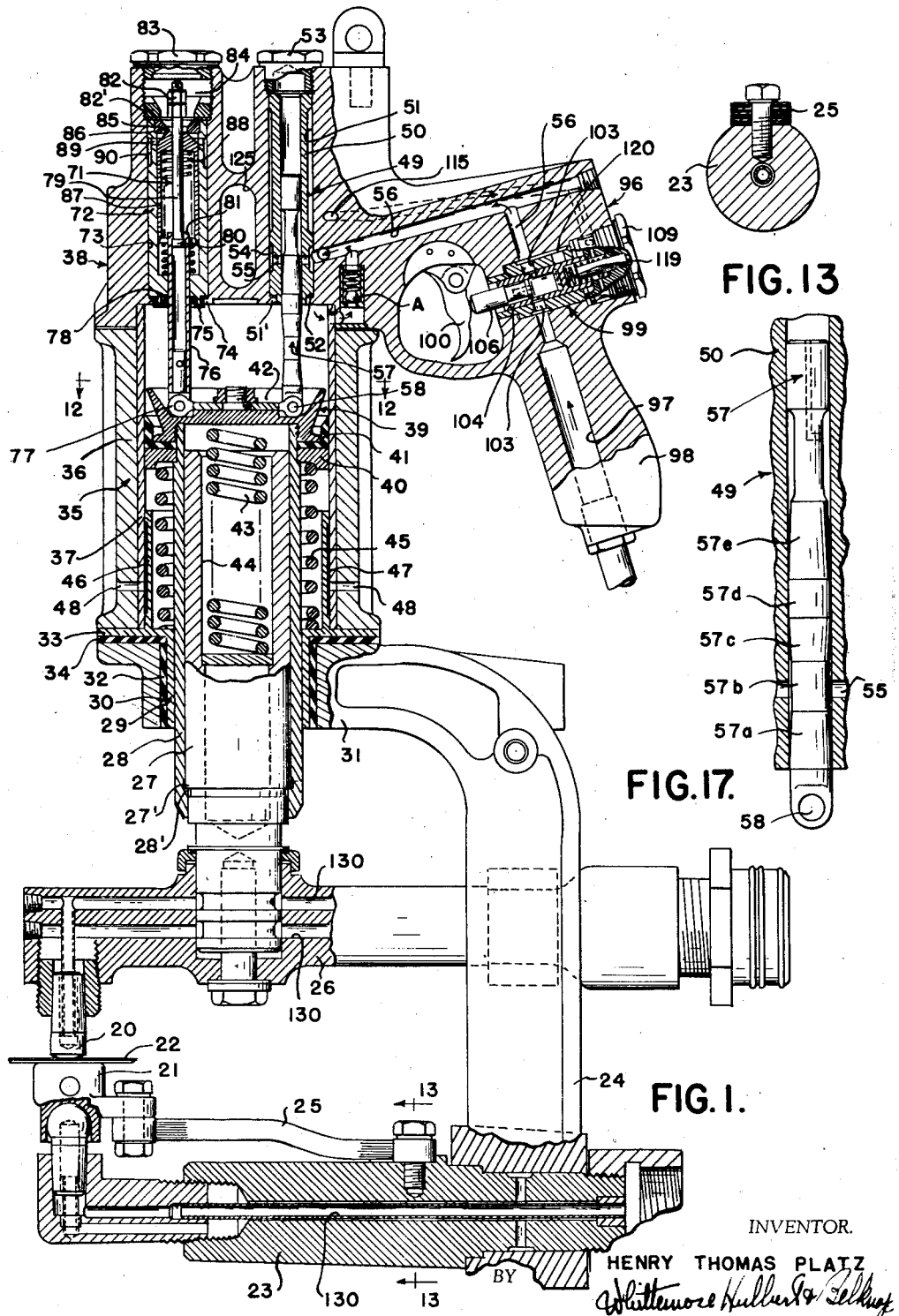

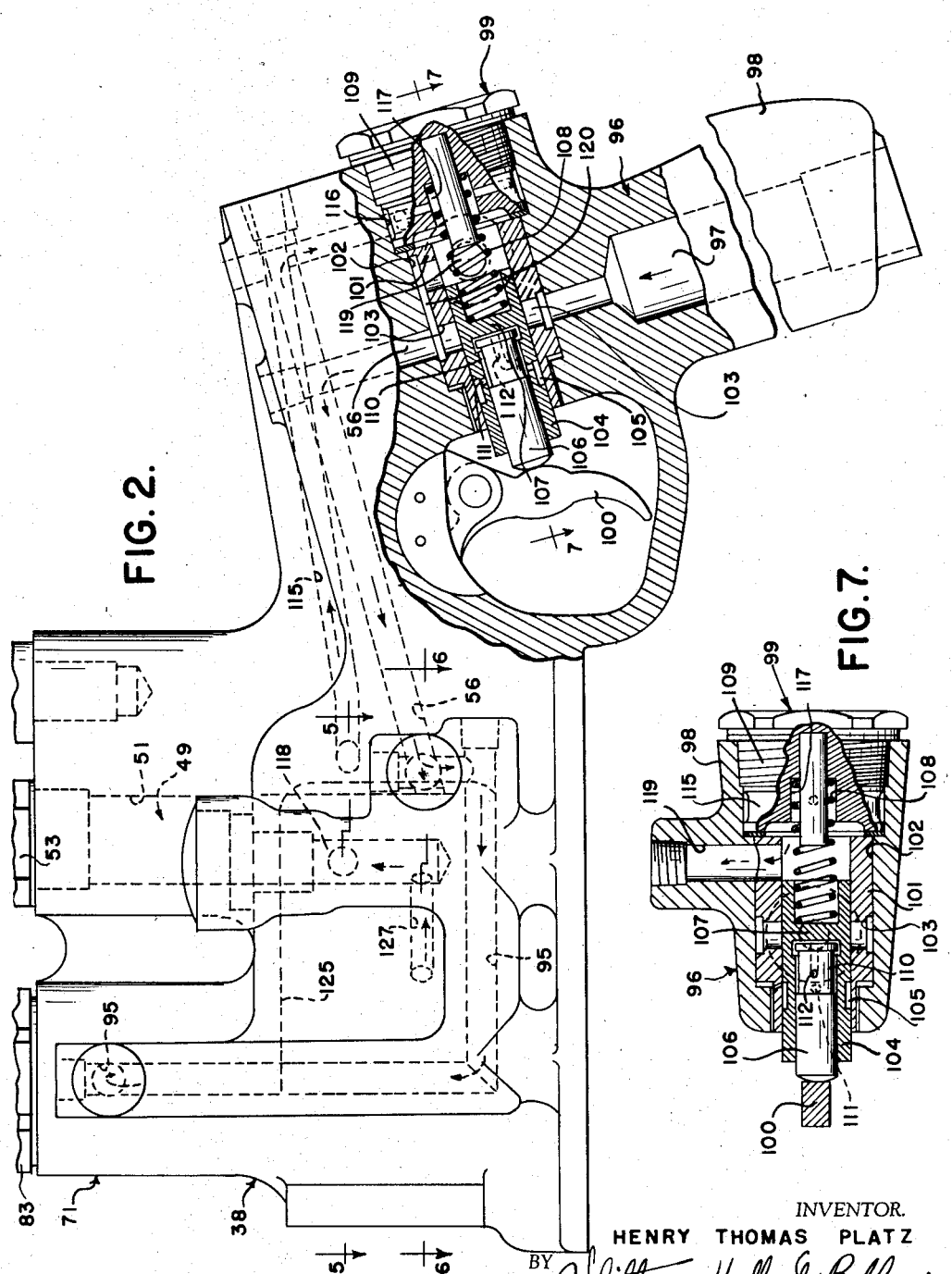

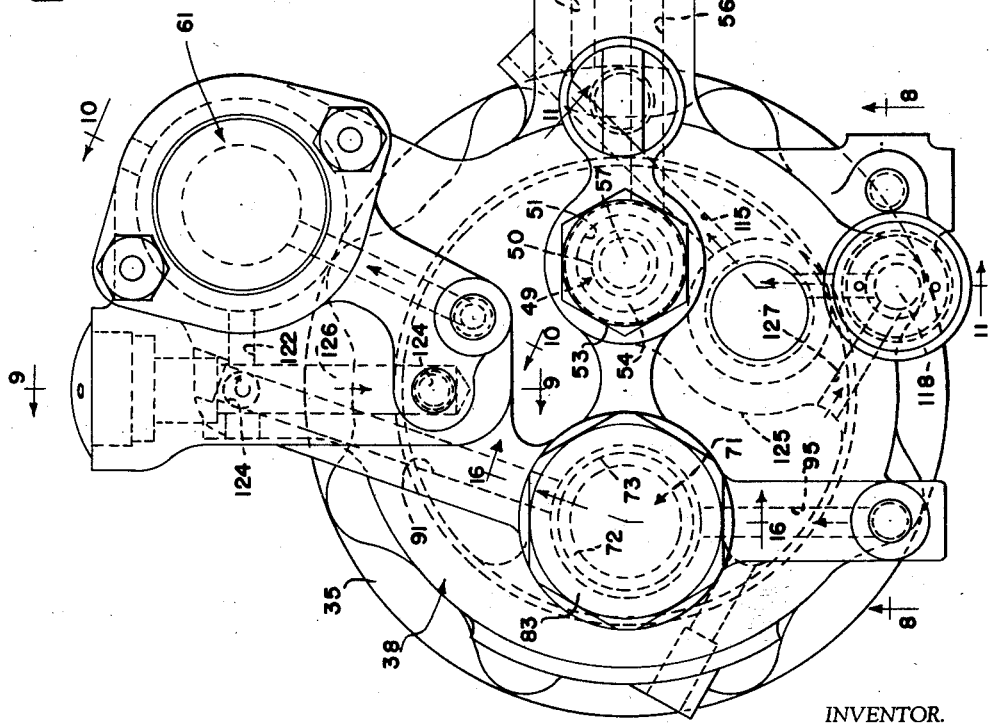

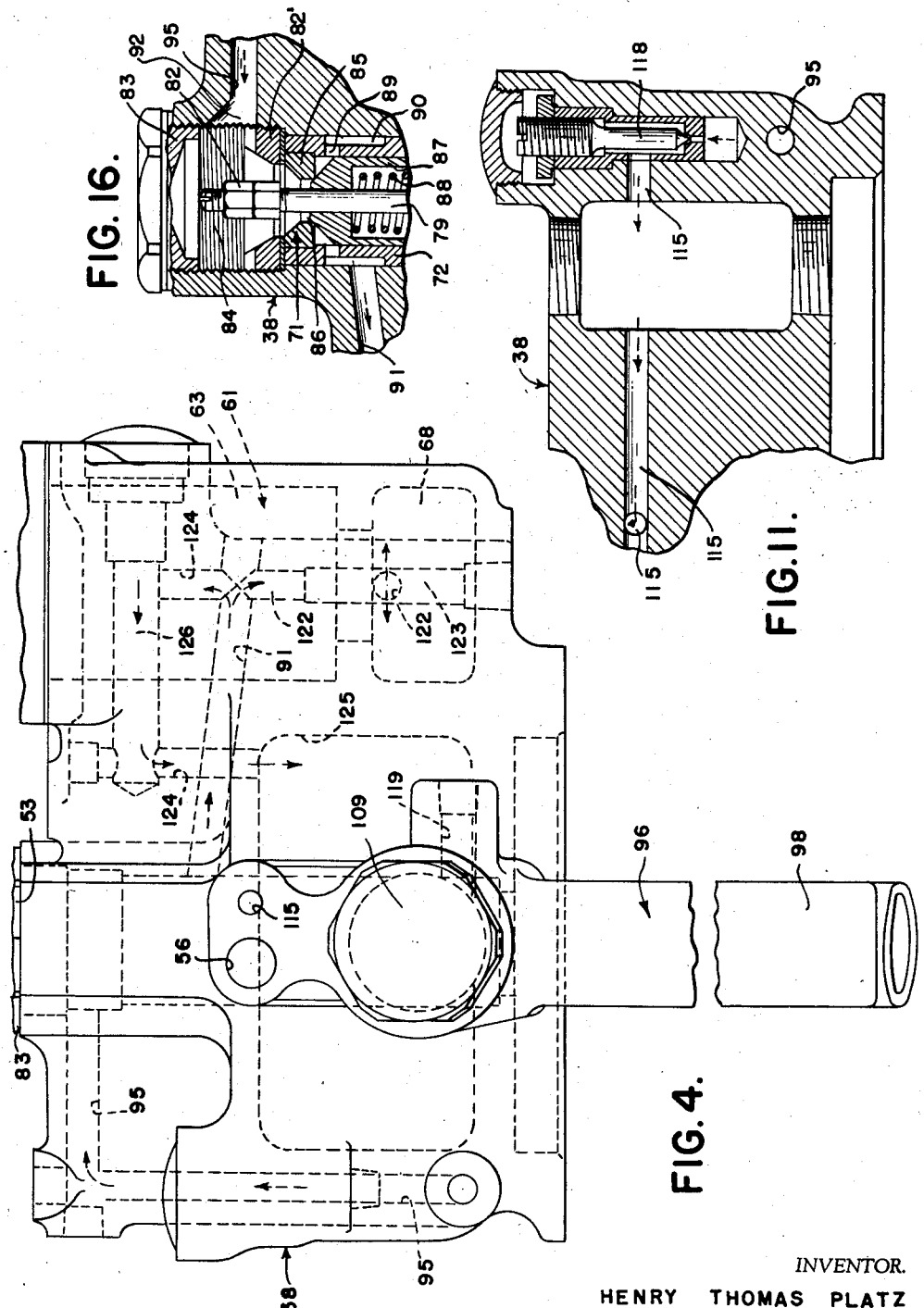

INVENTOR.
HENRY THOMAS PLATZ
BY
ATTORNEYS

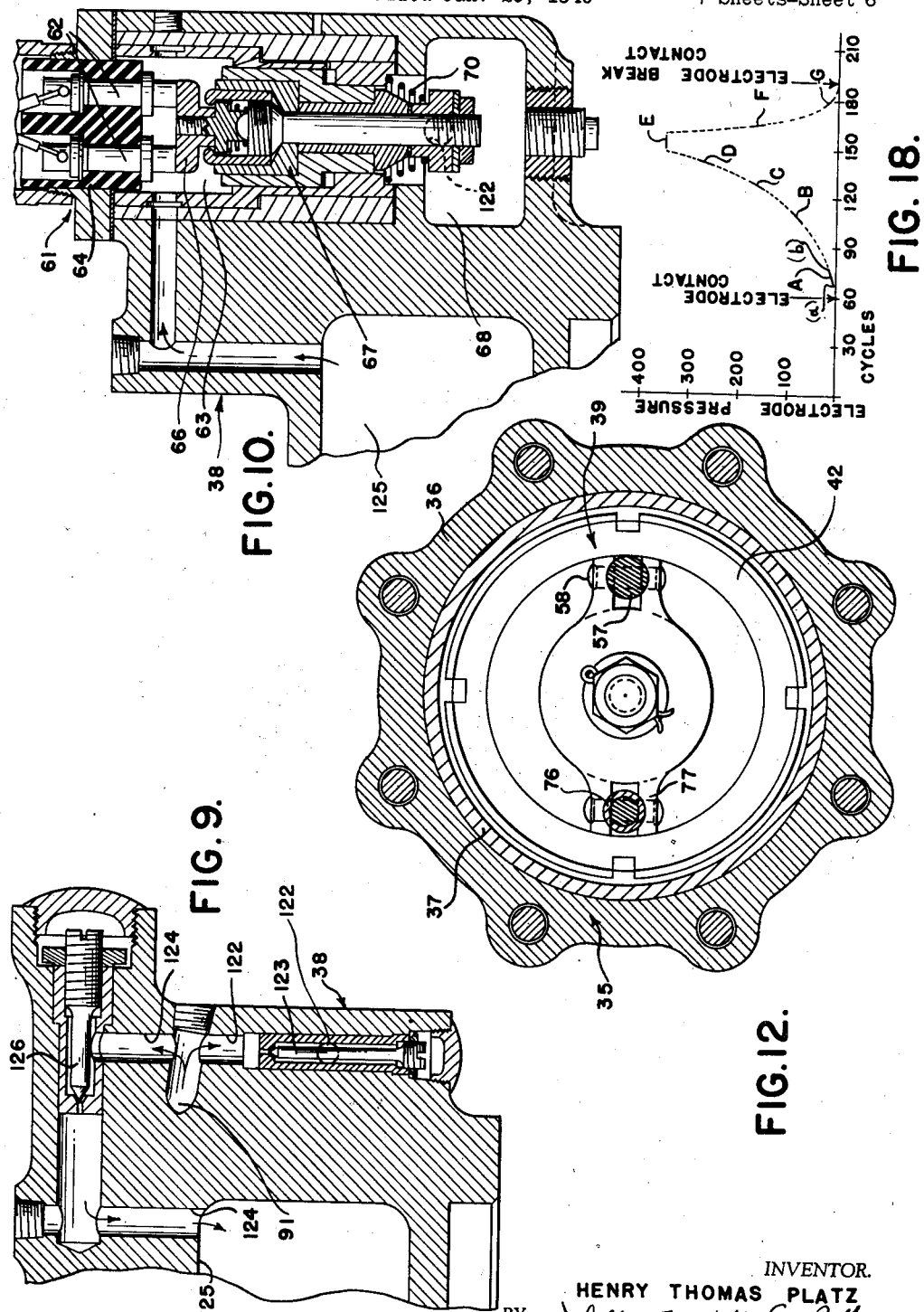

Jan. 20, 1942.  H. T. PLATZ  2,270,767
WELDING EQUIPMENT
Filed Jan. 29, 1940  7 Sheets-Sheet 7

INVENTOR.
HENRY THOMAS PLATZ
BY
ATTORNEYS

UNITED STATES PATENT OFFICE 2,270,767

WELDING EQUIPMENT

Henry Thomas Platz, Detroit, Mich., assignor to Briggs Manufacturing Company, Detroit, Mich., a corporation of Michigan Application January 29, 1940, Serial No. 316,241

22 Claims. (Cl. 219—4)

This invention relates generally to welding apparatus and refers more particularly to improvements in welding equipment of the type having electrodes relatively movable into engagement with the work.

One of the principal objects of this invention resides in the provision of a welder having an electrode movable into engagement with the work by fluid pressure and having means controlling the pressures applied to the electrode rendering it possible to not only regulate the rate of travel of the electrode toward the work, but to also regulate the time maximum pressure is applied to the work by the electrode.

Another advantageous feature of the present invention resides in the provision of a welder of the type set forth having means effective during the pressure cycle to close and open an electric circuit serving the electrodes.

Still another object of the present invention resides in the provision of a welder having means for regulating the interval of operation of the circuit controlling means in the pressure cycle. In other words, with the present invention, the actual welding period may be effected at any point in the pressure cycle before the maximum or forging pressure is reached. For example, in welding metals having a relatively low melting point, such as aluminum or certain alloys of aluminum, it may be desirable to effect the weld at a relatively low pressure so that the metal has an opportunity to forge during application of increasing pressure and to cool before the electrodes disengage.

A still further object of the present invention consists in the provision of a welder wherein the electrodes are relatively moved into engagement with the work by a fluid pressure operated device and wherein both the pressure control means and the circuit control means are actuated by said device to operate their respective instrumentalities in timed relation to movement of said device.

In accordance with the present invention, the pressure control means is in the form of a valve connected to the device for admitting fluid under pressure to the device at a variable rate depending upon the nature of the work to be welded and various other conditions. In addition, the circuit control means is in the form of a fluid pressure actuated switch and the means for admitting fluid pressure to the switch comprises a valve connected to the device for actuation by the device at a preselected point in the movement of the latter in the direction aforesaid to supply the fluid pressure to the switch required to close the circuit to the electrodes.

In addition to the foregoing, the present invention contemplates circulating a cooling medium in heat conducting relationship to the electrodes so as to insure sufficient solidification of the metal before the higher forging pressures are applied to the work. As a result, the time involved to complete one welding cycle is reduced and this is particularly advantageous in production.

With the foregoing, as well as other objects in view, the invention resides in the novel relatively simple apparatus which insures obtaining the accurate control of the pressures and welding cycle required to satisfactorily weld metals of relatively low melting temperatures.

The above will be made more apparent as this description proceeds, especially when considered in connection with the accompanying drawings, wherein:

Figure 1 is a fragmentary sectional view through a portable welding device constructed in accordance with this invention;

Figure 2 is an enlarged side elevational view, partly in section, of a portion of the device shown in Figure 1;

Figure 3 is a plan view of the construction shown in Figure 2;

Figure 4 is an end elevational view of the construction shown in Figure 2;

Figure 7 is a sectional view taken substantially on the plane indicated by the line 7—7 of Figure 2;

Figure 8 is a sectional view taken substantially on the plane indicated by the line 8—8 of Figure 3;

Figure 9 is a sectional view taken substantially on the plane indicated by the line 9—9 of Figure 3;

Figure 10 is a sectional view taken substantially on the plane indicated by the line 10—10 of Figure 3;

Figure 11 is a sectional view taken substantially on the plane indicated by the line 11—11 of Figure 3;

Figure 12 is a sectional view taken substantially on the plane indicated by the line 12—12 of Figure 1;

Figure 13 is a cross sectional view taken substantially on the plane indicated by the line 13—13 of Figure 1;

Figure 16 is a sectional view taken substantially on the line 16—16 of Figure 3;

Figure 17 is an enlarged sectional view featuring the pressure control valve for the electrode piston;

Figure 18 illustrates a typical pressure curve.

Figure 6:
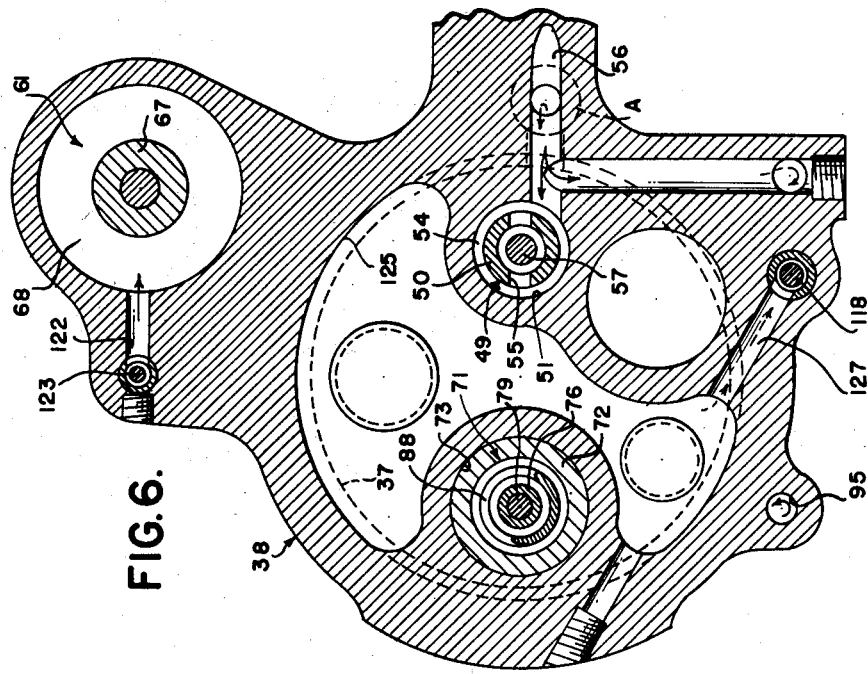
Figure 6 is a sectional view taken substantially on the plane indicated by the line 6—6 of Figure 2.
Figure 5:
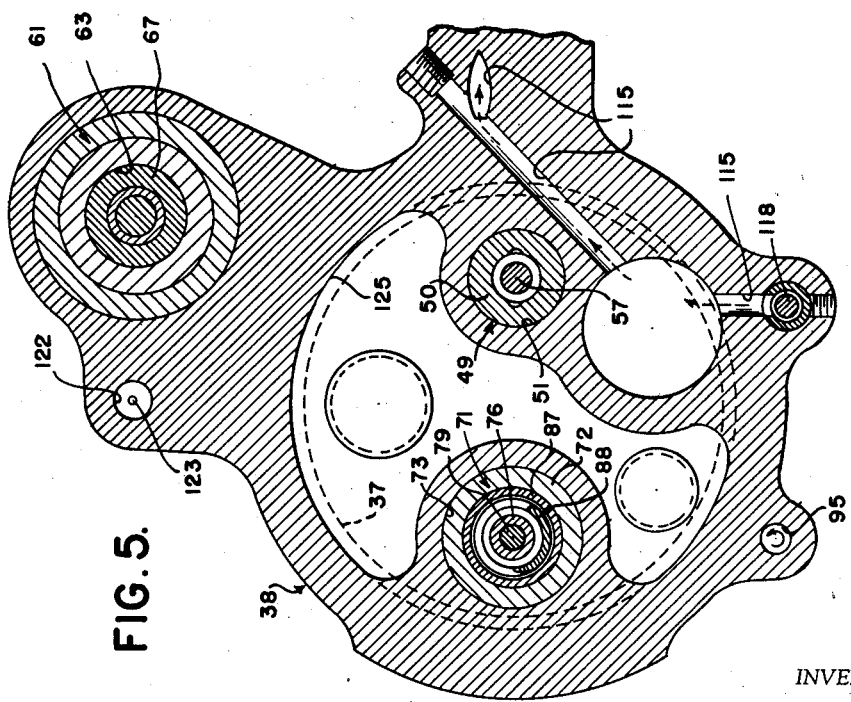
Figure 5 is a sectional view taken substantially on the plane indicated by the line 5—5 of Figure 2.

The welding device, shown in Figure 1 of the drawings for the purpose of illustration, is of the portable resistance type having a pair of electrodes 20 and 21 mounted for relative movement toward and away from each other. In the present instance, the electrodes are relatively moved toward each other by fluid under pressure to effectively clamp the work 22 therebetween and are relatively moved in the opposite direction to release the work by suitable spring means.

The lower electrode 21 is suitably universally adjustably mounted on one end of a contact arm 23 having the opposite end suitably secured in a yoke 24. The contact arm 23 is electrically connected in one side of the secondary circuit (not shown) and is formed of a metal having good electrical transmission characteristics to supply electrical energy to the electrode 21. If desired, a jumper bar 25 may be provided to directly connect the electrode 21 to the contact arm 23, as shown in Figure 1.

The upper electrode 20 is suitably secured to a second electrical contact arm 26 which is electrically connected to the opposite side of the secondary circuit (not shown) through the various parts of the welder and is secured intermediate the ends thereof to the lower end of a plunger 27 mounted in a sleeve 28. As shown in Figure 1, the plunger 27 is reduced adjacent the lower end to form an annular shoulder 27' normally seated on a corresponding shoulder 28' formed on the sleeve 28. As a result, the sleeve 28 may move downwardly relative to the plunger 27, and this is desirable for reasons to be more fully hereinafter discussed. The sleeve 28 is, in turn, slidably mounted in a bushing 29 extending through an opening 30 formed in a horizontal extension 31 at the upper end of the yoke 24 and insulated from the yoke by means of a sleeve 32 of dielectric material. As shown in Figure 1, the bushing 29 is provided with a laterally outwardly extending annular portion 33 overlapping the top of the extension 31 and seated on a washer or gasket 34 of insulating material. Thus, it will be seen that the upper electrode 20 and associated parts are insulated from the yoke 24 which carries the cooperating lower electrode assembly 21.

The upper ends of the plunger 27 and associated sleeve 28 extend into a cylinder 35 comprising a tubular body member 36 and a liner 37 sleeved in the body member. The lower ends of the body 36 and liner 37 are seated upon the flange 33, extending laterally from the upper end of the bushing 29, and the upper end of the liner projects beyond the adjacent end of the body a sufficient distance to form a pilot for positioning a valve head 38 on the top of the body 36. The valve head 38 is suitably secured to the body 36 and forms a closure for the upper end of the cylinder 35.

A piston assembly 39 is reciprocably mounted in the cylinder 35 and is suitably secured to the upper end of the sleeve 28. As shown in Figure 1, the piston assembly comprises a ring 40 and a flexible cup-shaped seal 41 provided with a lip of sufficient diameter to frictionally engage the cylinder wall throughout the circumference thereof. The periphery of the ring also slidably engages the cylinder wall and both parts are centrally apertured to permit the upper end of the tube 28 to be extended therethrough.

The upper end of the sleeve 28 is closed by a cap 42 threadedly mounted on the tube and having a portion extending into the cup-shaped seal 41 to form an abutment for the piston assembly 39. The central portion of the cap also forms an abutment for the upper end of a coil spring 43 located within the sleeve 28 and having the lower end acting upon the plunger 27. In this connection, it will be noted that the upper end of the plunger 27 is axially bored, as at 44, to receive the spring 43. The spring 43 functions to maintain the shoulder 27' on the plunger 27 into engagement with the shoulder 28' on the sleeve 28 and yieldably resists movement of the sleeve 28 relative to the plunger 27 in a downward direction by the piston assembly 39. It may also be pointed out at this time that downward movement of the piston assembly and associated parts from their inoperative or uppermost position in the cylinder 35 is resisted by a coil spring 45. The coil spring 45 is located in the cylinder 35 around the sleeve 28 and the opposite ends of the coil spring respectively abut the piston part 40 and the washer 33. In this connection, attention is called to the fact that the bushing 29 is formed with an upwardly projecting tubular extension 46 within which the lower end portion of the spring 45 extends.

With the construction as thus far described, it will be noted that initial downward movement of the piston assembly 39 in the cylinder 35 is resisted by the coil spring 45 and effects a corresponding downward movement of the plunger 27 until the electrode 20 is positively arrested by engagement with the work 22 whereupon continued downward movement of the piston assembly 39 is effected relative to the plunger 27. This continued downward movement of the piston assembly 39 requires compression of the spring 43, as well as the spring 45, and, accordingly, the clamping pressure on the work 22 is necessarily substantially increased. The piston assembly 39 continues to move relative to the plunger 27 until the cap 42 abuts the upper end of the plunger whereupon the work 22 is subjected to the maximum pressure of the piston motivating means which, in the present instance, is fluid under pressure.

Upon a substantial drop in the pressure of the fluid admitted to the cylinder 35 above the piston assembly 39, the latter assembly, together with the sleeve 28, plunger 27 and associated parts, are moved upwardly to release the electrode 20 from the work by the coil spring 45. It will, of course, be understood that during the above return movement of the parts, the plunger 27 is moved to its original position relative to the sleeve 28 wherein the shoulder 27' on the plunger seats on the shoulder 28' on the sleeve. The external diameter of the tubular extension 46 approximates the internal diameter of the cylinder 35 and the central portion of the outer surface is relieved to form an annular recess 47. The annular recess 47 communicates with aligned openings 48 formed in the cylinder liner 37 and body 36. These openings 48 communicate with the atmosphere and provide for exhausting any fluid trapped beneath the piston assembly 39.

The admission of fluid pressure into the cylinder 35, above the piston assembly 39, is controlled by means of a valve assembly 49 mounted in the valve head 38. The valve assembly 49 is provided with a sleeve 50 positioned within a bore 51 formed in the valve head 38 and having the lower end communicating with the interior of the cylinder through the upper end of the latter. As shown in Figure 1 of the drawings, the lower end of the bore 51 is reduced to provide a shoulder 51' and the adjacent end of the sleeve 50 is likewise reduced to form a shoulder 52 arranged in abutting engagement with the shoulder 51' and held against the latter shoulder by means of a plug 53 threaded in the upper end of the bore 51. The sleeve 50 is also fashioned with an annular recess in the exterior surface thereof cooperating with the adjacent surface of the bore to provide an annular groove 54 communicating with the interior of the sleeve through the medium of a plurality of circumferentially spaced apertures 55. The groove 54 also communicates with a fluid pressure supply passage 56 formed in the valve head 38 and supplied with fluid under pressure in a manner to be presently set forth.

The passage of fluid pressure from the interior of the sleeve 50 to the upper end of the cylinder 35 is regulated by a valve member 57 in the form of a plunger reciprocably mounted in the sleeve 50 and having the lower end pivotally connected to the cap 42 by means of a pin 58. In the present instance, the valve plunger 57 is calibrated to cooperate with the inner surface of the portion of the sleeve 50 below the ports 55 to control the flow of fluid pressure into the cylinder 35 in a manner to effect the following travel of the electrode 20: (1) relatively slow initial movement of the electrode 20 from its retracted position toward the work to overcome the inertia of the ports, (2) acceleration of the electrode 20 until the latter assumes a position in close proximity to the work to reduce the time of the cycle to a minimum, (3) retardation of the electrode velocity to reduce the force of contact of the electrode 20 with the work, and (4) permitting relatively free flow of fluid pressure to the cylinder 35 after the electrode engages the work to produce the desired high pressure forging operation.

With the above in mind, reference is now made to Figure 17, wherein it will be noted that the valve plunger 57 is fashioned with five pressure control portions $57^a$, $57^b$, $57^c$, $57^d$, and $57^e$. In Figure 17, the valve plunger 57 is illustrated in the position it assumes when the electrode is in its uppermost position relative to the work. In this position of the plunger, the lower end of the portion $57^a$ is in the lower end of the sleeve 50 and has a diameter such that the flow of fluid pressure into the cylinder 35 is restricted sufficiently to cause a gradual initial movement f the electrode 20 toward the work. This is desirable in that it provides for overcoming the inertia of the parts and insures smooth, vibrationless operation. The portion $57^a$ of the valve plunger tapers slightly to the smaller diametered portion $57^b$ so as to provide flow of fluid pressure into the cylinder at a faster rate and correspondingly effect an acceleration of the electrode 20. The portion $57^b$ of the valve plunger 57 provides for the flow of fluid pressure into the cylinder 35 at a relatively fast rate so as to reduce the time required to engage the electrode 20 with the work to a minimum. However, the portion $57^b$ of the valve plunger 57 is not of sufficient length to permit the electrode 20 to engage the work while moving at the fast rate mentioned above, since this would cause a severe shock which, of course, would be undesirable. Accordingly, the flow of fluid pressure to the cylinder 35 is throttled by the portion $57^c$ of the valve plunger 57. The portion $57^c$ is tapered from the relatively small diameter of the upper end of the portion $57^b$ to the larger diameter of the portion $57^d$ and, as a result, effects retardation of the movement of the electrode as it approaches the work. The rate of flow of fluid pressure into the cylinder is then restricted for an interval by the portion $57^d$ and during this time the electrode 20 engages the work.

After the electrode 20 is in engagement with the work, the portion $57^e$ controls the flow of fluid pressure into the cylinder 35 and this portion is tapered from the relatively large diameter of the portion $57^d$ to a smaller diameter to again increase the rate of flow of fluid pressure into the cylinder until the maximum forging or line pressure is obtained in the cylinder 35.

Circuit control

In welding metals having a low melting point, such as aluminum or aluminum alloy, it is desirable to accurately control the circuit to the electrodes in relation to the differential pressures. In the present instance, the circuit to the electrodes is controlled in such a manner that the welding cycle may be effected at any period between the application of the predetermined minimum pressure on the work by the electrodes and the application of the maximum pressure on the work by the electrodes. The interval at which the welding cycle is effected is contingent upon the size of the welder and the thickness, as well as the nature of the stock to be welded. When welding metals having a relatively low melting point, the welding cycle is preferably of short duration and is accomplished at a relatively low pressure so as not to displace the plastic metal between the electrodes. However, greater pressures are required to forge the work subsequent to the welding cycle and with the above arrangement, this desirable feature may be readily attained.

In detail, the primary circuit (not shown) is opened and closed by means of a switch 61, shown in Figure 10 as supported on the valve head 38. In actual practice, the switch 61 is electrically connected in a primary circuit which includes the usual relay or other suitable device (not shown) for actuating the main supply switch in the primary circuit. The switch 61 is illustrated in Figure 10 as having a pair of stationary electrical contacts 62 projecting into a fluid pressure chamber 63 and carried by an insulating block 64 adapted to close the upper end of the chamber. Also, extending into the chamber 63 is a movable bridge member 66 operatively connected to a piston assembly 67 and engageable with the contacts 62 to close the circuit to the electrodes. The piston assembly 67 is suitably slidably supported in the switch casing and the lower end thereof projects into a second chamber 68.

Both the chambers 63 and 68 communicate with the fluid pressure supply passage 56 in a manner to be more fully hereinafter set forth and the switch piston 67 is normally urged in a direction to disengage the cooperating contacts by means of a spring 70. Attention may also be called to the fact at this time that the area of the piston assembly 67 exposed to the interior of the chamber 68 is substantially less than the area of the piston assembly exposed to the interior of the chamber 63. In general, the fluid under pressure admitted to the chamber 68 acts upon the relatively small end of the piston assembly and overcomes the action of the spring 70 to engage the movable contact bridge 66 with the stationary contacts 62 to close the primary circuit. On the other hand, the fluid pressure admitted to the chamber 63 acts upon the relatively large end of the piston assembly 67 and when this pressure plus the force exerted by the spring 70 exceeds the pressure in the chamber 68, the bridge member 66 is moved away from the stationary contacts 62 to open the primary circuit. As will be presently set forth, the operation of the switch 61 is accurately timed with the fluid pressure control means to effect the welding cycle at the desired period.

Figures 14, 15:
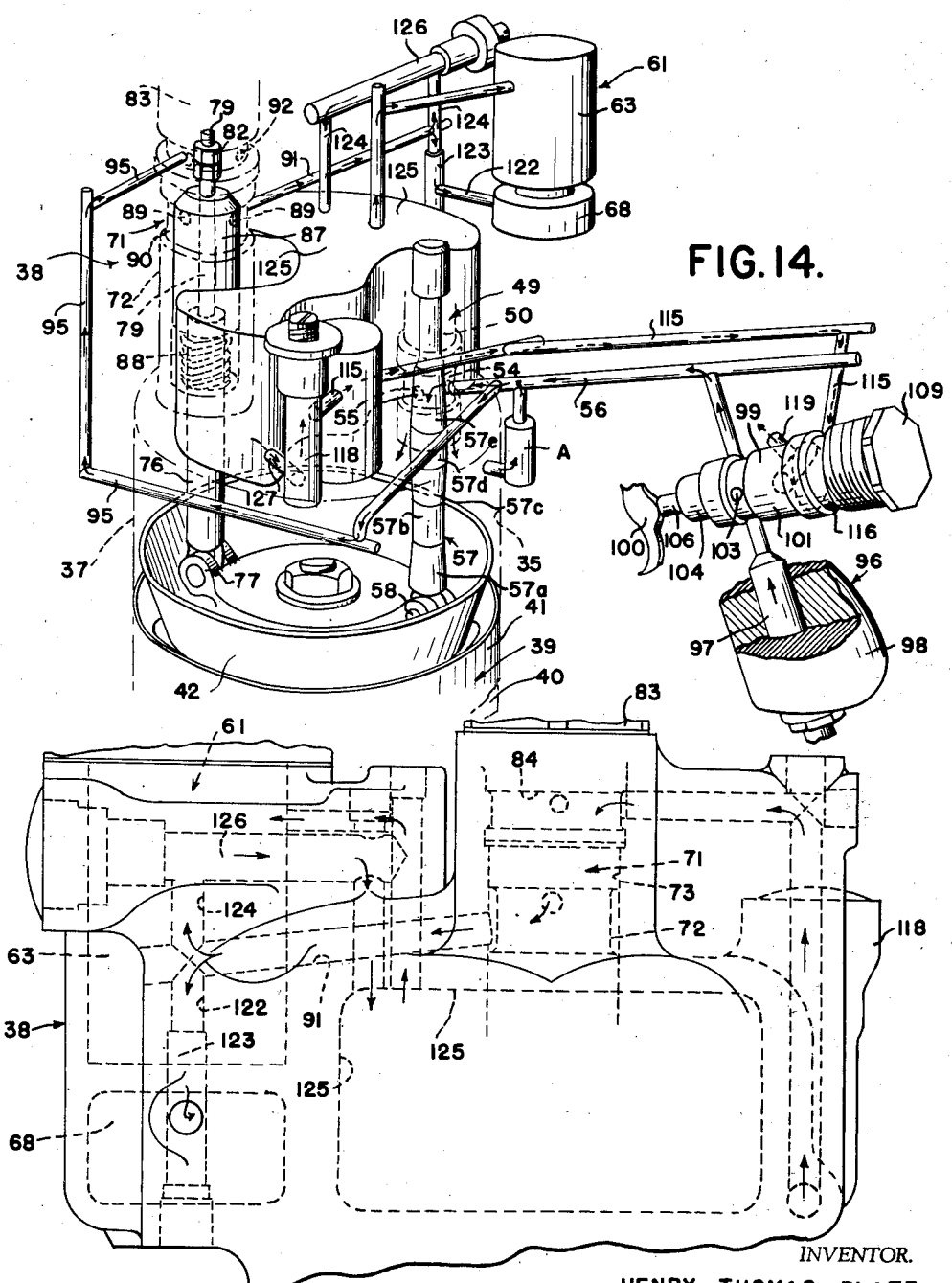
Figure 14 is a diagrammatic view of the apparatus.
Figure 15 is an elevational view of the construction shown in Figure 2.

Upon reference to Figures 1 and 14, it will be noted that the flow of fluid pressure to the switch 61 is controlled by a valve assembly 71 also secured in the valve head 38. The valve assembly 71 is shown in Figure 1 as having a sleeve 72 mounted within a bore 73 formed in the valve head 38 and opening into the upper end of the cylinder 35. The lower end of the bore 73 is reduced to form an annular shoulder 74 cooperating with a shoulder on the lower end of the sleeve 72 to secure a seal retainer 75 therebetween. It will also be noted that the bore through the sleeve 38 is reduced at the lower end to slidably receive a tube 76 having the lower end pivotally connected to the cap 42 by means of a clevis 77. A suitable seal 78 surrounds the tube 76 and is held in sealing engagement therewith by means of the retainer 75.

The upper end of the tube 76 projects into the bore of the sleeve 72 and telescopically engages a plunger 79 having a head 80 at the lower end cooperating with an internal annular shoulder 81 at the upper end of the tube 76 to provide a driving connection therebetween. The upper end of the plunger 79 projects beyond the corresponding end of the sleeve 72 and is threaded for adjustably receiving a stop 82, the purpose of which will be more fully set forth.

The sleeve 72 is held in assembled relation with the valve head 38 by means of a clamping ring 82' threaded in the upper end of the bore and seated against an annular shoulder in said bore. The upper end of the bore communicates with a recess 84 closed by a plug 83 and which is sufficient in size to freely receive the stop 82 on the upper end of the plunger 79. It will be observed from Figure 1 that the recess 84 is restricted by a closure member 85 sleeved in the upper end of the sleeve 72 and having a restricted opening 86 therethrough. The closure 85 seats against a shoulder formed in the sleeve 72 and is clamped against this shoulder by the ring 82'. The opening 86 is fashioned with a diameter greater than the diameter of the stop 82 on the plunger 79 to permit the free passage of said stop therethrough. The arrangement is such that when the electrode piston assembly 39 is moved downwardly under the action of fluid pressure, the tube 76 is moved as a unit with the piston assembly and engages the shoulder 81, at the upper end of the tube, with the enlarged head 80 on the lower end of the plunger 79. As a result, the plunger 79 is also moved downwardly and the adjustable stop 82 is moved through the opening 86 in the closure 85.

As the adjustable stop 82 moves downwardly through the opening 86 in the closure 85, it engages a valve piston 87 slidably mounted in the sleeve 72 and normally urged, by a spring 88, into engagement with the bottom surface of the closure 85 to close communication between the recess 84 and the sleeve 72. Upon reference to Figure 16, it will be noted that the recess 84 communicates with a fluid pressure supply passage 95 through the medium of a port 92. Attention is called to the fact at this time that the spring 88 is of sufficient strength to maintain the valve piston 87 in seating relationship with the closure 85 against the force of the fluid under pressure acting on the valve piston 87 and, accordingly, the fluid pressure is trapped in the recess 84 until the valve piston 87 is positively moved away from the closure 85 by the stop 82. However, when the piston assembly 39 moves downwardly in the manner set forth above, the stop 82 engages the piston valve 87 and moves the same against the action of the spring 88 to permit fluid pressure to flow into the upper end of the sleeve 72. The fluid under pressure entering the sleeve 72 flows through a series of ports 89 formed through the side wall of the sleeve 72 adjacent the upper end thereof and communicating with an annular chamber 90 extending around the sleeve 72. As shown in Figure 16, the chamber 90 communicates with a fluid supply passage 91 which, in turn, communicates with both the switch chambers 63 and 68 in a manner to be presently described.

As will be presently set forth, the passage 91 serves the switch 61 with the required fluid under pressure to operate this switch. It follows, therefore, that the period at which the switch operates with respect to clamping engagement of the electrodes with the work may be accurately regulated by adjusting the position of the stop 82 on the plunger 79. In other words, the valve assembly 71 may be regulated to operate in timed relation to the operation of the valve assembly 49 to admit fluid pressure to the switch 61 at any preselected clamping pressure applied to the work by the electrodes.

Reference has been made above to the fact that the several instrumentalities of the welder are served with fluid under pressure from the supply passage 56. This passage is formed in the handle portion 96 of the welder and communicates with a source of fluid under pressure by means of a passage 97 formed in the grip 98 of the handle portion. The handle portion is formed integral with the valve head 38 and is fashioned to receive a valve assembly 99 between the passage 56 and the passage 97. The valve assembly 99 controls communication between the passage 97 and the passage 56, and is manually operated by means of a trigger 100 suitably pivotally mounted on the handle portion in convenient position to the grip 98.

Upon reference to Figure 2, it will be noted that the valve assembly 99 comprises a cylinder in the form of a sleeve 101 fixed in a bore 102 formed in the handle portion 96 opposite the trigger 100 and having ports 103 in opposite side walls respectively communicating with the fluid pressure supply passages 56 and 97. Communication between the ports 103 is controlled by a piston in the form of a tube 104 slidably mounted in the cylinder 101 and having an annular groove 105 formed in the outer surface thereof for registration with both the ports 103 when the piston 104 is in its operative position, shown in Figure 1.

The piston or tube 104 is moved to its retracted position by means of a plunger 106 slidably mounted in the tube 104 with the forward end extending beyond the tube 104 for engagement with the rear side of the trigger 100 and having the rear end adapted to engage a transverse partition 107 in the piston or tube 104. The opposite side of the partition 107 also forms an abutment for the forward end of a spring 108 located in the cylinder 101 and having the rear end abutting a closure cap 109 threaded in the rear end of the bore 102. As a result, the spring 108 normally urges the piston 104 to its outermost position shown in Figure 2 wherein communication between the supply passage 97 and passage 56 is closed.

With the above construction, it will be noted that operation of the welder is initiated by manipulating the trigger 100 to move the plunger 106 rearwardly into engagement with the partition 107. Continued rearward movement of the plunger by the trigger effects a corresponding movement of the piston 104 against the action of the spring 108 and registers the groove 105 in the piston with the ports 103 in the cylinder. Inasmuch as the ports 103 register with the passages 56 and 97, it follows that fluid under pressure flows to the several instrumentalities of the welder to actuate the latter in a manner to be more fully set forth in the following description of the operation of the welder.

Attention may be called to the fact at this time that the plunger 106 is returned to its forwardmost position by the fluid pressure flowing from the passage 97. Upon reference to Figure 2, it will be noted that the rear end portion of the plunger 106 is reduced to form an annular chamber 110 around the plunger communicating with the annular chamber 105 in the piston 104 by means of a port 111 and also communicating with the space in rear of the plunger by means of a passage 112 formed in the plunger. As a result, when the piston 104 is in its rearwardmost position, fluid pressure builds up behind the plunger and returns the plunger to its forwardmost position against any pressure that may be applied to the trigger 100 by the operator.

In accordance with the present invention, the piston 104 is automatically moved to a position wherein communication between the passages 97 and 56 is closed by means of fluid under pressure admitted to the cylinder 101 at the rear side of the piston. The fluid under pressure is admitted to the cylinder 101 at the rear side of the piston 104 by means of the passage 115 communicating with an annular chamber 116 surrounding the cap 109 within the bore 102. The annular chamber 116 is shown in Figure 2 as communicating with a central recess 117 formed in the cap 109 and this recess, in turn, communicates with the rear end of the cylinder 101. The arrangement is such that when the pressure of the fluid at the rear end of the piston 104 plus the force exerted by the spring 108 exceeds the fluid pressure flowing from the supply passage 97 to the passage 56, the piston is moved to the position thereof shown in Figure 2 wherein communication from the supply passage 97 to the passage 56 is discontinued. It follows, therefore, that the rate of pressure rise in the cylinder 101 at the rear side of the piston 104 determines the interval in the welding cycle at which the flow of fluid pressure to the welder is discontinued and, in the present instance, this period may be regulated by a metering valve 118 located in the passage 115.

When the piston 104 is returned to its closed position shown in Figure 2, communication is established between an exhaust port 119 and both of the passages 56 and 115. Upon reference to Figure 2, it will be noted that the exterior surface of the cylinder 101 is formed with an elongated passage 120 registering with the entrant end of the passage 56 and communicating with the rear end of the cylinder 101 which, in turn, communicates with the atmosphere through the exhaust passage 119. Inasmuch as the passage 115 also communicates with the rear end of the cylinder 101, it necessarily follows that when the piston 104 is in its forwardmost position shown in Figure 2, the switch 61 and associated fluid pressure passages are exhausted. It will, of course, be understood that when the electrode cylinder 35 communicates with the exhaust passage 119, the pressure in this cylinder above the piston assembly 39 drops to such an extent as to permit the springs 43 and 45 to return the piston assembly to its uppermost position. The valve member 57, of course, moves upwardly with the piston assembly 39 and, as the tapered valve surface moves into the sleeve 50, the rate of exhaust through the passage 56 is restricted. This, of course, is objectionable in that it reduces the number of welds capable of being performed in a given time interval and is avoided herein by providing a pressure relief valve A for the cylinder 35. As shown in Figure 1, the pressure relief valve operates upon initial upward movement of the piston assembly 39 by the springs to quickly exhaust the cylinder 35 into the atmosphere.

*Operation*

Having described in detail the several instrumentalities of the welding device, reference will now be made to the manner in which the various instrumentalities cooperate to satisfactorily produce a weld. Assuming that the various parts of the welding device are in their relative positions shown in Figure 1, it will be noted that the operator grasps the grip portion 98 of the welder and exerts a rearward pull on the trigger 100. As a result of this movement of the trigger 100, the plunger 106 is moved rearwardly to engage the partition 107 in the piston 104 and effects a corresponding movement of the piston to a position wherein the annular chamber 105, surrounding the piston, registers with the ports 103. As pointed out above, movement of the piston 104 to its operative position also registers the passage 112 in the plunger with the fluid pressure supply line 97, with the result that fluid pressure builds up in the piston behind the plunger and forces the latter outwardly against any pressure that may be applied to the trigger 100 by the operator. The control of the welder is then divorced from the operator and the several instrumentalities of the welder are automatically operated in proper timed relationship without any assistance from the operator.

When the piston 104 is in its rearwardmost position set forth above, fluid under pressure is by-passed around the piston to the passage 56. The flow of fluid under pressure from the passages 56 to the cylinder 35 is controlled by the valve plunger 57 in the manner defined in detail above. It will suffice to bring out at this point that when the pressure in the upper end of the cylinder 35 exceeds the counteracting force applied to the piston assembly 39 by the spring 45, the piston assembly and associated parts are moved downwardly as a unit to engage the electrode 20 with the work 22. As the piston assembly 39 moves downwardly in the cylinder 35, the valve member 57 is also moved downwardly and the rate of flow of fluid pressure into the cylinder 35 or, in other words, the rate of travel of the electrode 20 is respectively controlled by the portions 57ª, 57ᵇ, 57ᶜ, 57ᵈ and 57ᵉ of the valve plunger 57. During the interval the portion 57ᵈ controls the rate of flow of fluid pressure into the upper end of the cylinder 35, the electrode engages the work at a relatively slow speed to avoid undue shocks and continued movement of the electrode piston 39 relative to the electrode brings the portion 57ᵉ of the valve plunger 57 in operation to increase the pressure in the cylinder at a faster rate. As the pressure in the cylinder 35 increases, the additional force of the spring 43 is overcome and the sleeve 28 is moved downwardly relative to the plunger 27 until the cap 42 abuts the upper end of the plunger 27. When this condition exists, fluid pressure is permitted to flow relatively freely into the upper end of the cylinder 35 and, accordingly, the work 22 between the electrodes is subjected to the maximum pressure of the fluid.

The circuit to the electrodes is closed to effect the weld after the electrodes are relatively moved into engagement with the work and in timed relation to the maximum pressure exerted by the electrodes on the work. In this connection, attention is again directed to Figure 14 wherein it will be noted that fluid pressure also flows from the passage 56 into the passage 95 which communicates with the recess 84 formed in the cap 83 above the valve piston 87. As pointed out above, the valve piston 87 is operated by the spring 88 to normally close the recess 84 and is positively moved to open the port 86 at the lower end of the recess by means of the adjustable stop 82. The adjustable stop 82 is moved downwardly to actuate the valve piston against the action of the spring 88 by the piston assembly 39 and initial movement of the valve piston 87 in a downward direction permits fluid pressure to flow from the recess 84 to the passage 91. The passage 91 is shown in Figure 14 as communicating with the chamber 68 of the switch 61 by means of a passage 122 having a metering valve 123 therein for controlling the rate of pressure rise in the switch assembly 68. The fluid pressure in the chamber 68 of the switch acts upon the lower end of the plunger 67 and when this pressure exceeds the force of the counteracting spring 70, the plunger 67 is moved upwardly to engage the bridge contact 66 with the cooperating contacts 62. As a result, the switch 61 is closed and the circuit to the electrodes is established.

The interval that fluid under pressure is supplied to the chamber 68 to effect closing of the switch in relation to the clamping pressure applied to the work 22 by the electrodes may be accurately regulated by adjusting the stop 82 on the plunger 79. In the event that the work 22 constitutes metal having a relatively low melting point, it is desirable to effect closing of the switch 61 soon after the electrodes are relatively moved into engagement with the work so that the welding period may be consummated before the pressure becomes too great. By carefully adjusting the stop 82 and the metering valve 123, the switch may be automatically closed at any point in the range of pressures from a predetermined minimum pressure to the maximum pressure available. In welding metals having a low melting point, the duration of the weld is necessarily relatively short and is effected during the relatively low pressure periods so that the weld will have an opportunity to cool to some extent before the maximum clamping pressure is applied to the work.

Referring again to Figure 14, it will be noted that the fluid passage 91 also communicates with a passage 124 which communicates with a pressure accumulating chamber 125 through the medium of a metering valve 126. The accumulating chamber 125 also communicates with the chamber 63 of the switch and provides for building up the pressure in this chamber required to automatically open the switch after a predetermined interval elapses. The spring 70 in the switch, of course, assists the fluid pressure in the chamber 63 to open the switch against the action of the fluid pressure in the chamber 68 and the time interval of opening of the switch is regulated by the metering valve 126.

The pressure accumulating chamber 125 also communicates with the passage 115 by means of a passage 127 and the metering valve 118 is shown in Figure 14 as positioned between these two passages. As stated above, the fluid pressure flowing through the passage 115 is discharged into the recess 117 at the rear end of the cylinder 101 of the valve assembly 99 so as to permit building up the pressure in the cylinder 101 in rear of the piston 104 required to return the piston to its closed position, shown in Figure 2 of the drawings. The rate at which pressure is permitted to build up in rear of the piston 104 is accurately regulated by means of the metering valve 118 and the latter is adjusted to insure operation of the switch 61 to open the circuit to the electrodes before the piston 104 moves to its closed position in the cylinder 101. As a matter of fact, the rate of pressure rise at the rear end of the piston 104 in the cylinder 101 is delayed until the weld has been subjected to the maximum pressure of the fluid admitted to the electrode cylinder 35, and this is desirable in order to insure obtaining the proper forging of the weld.

When the piston 104 is moved to its closed or forwardmost position in the cylinder 101, the exhaust passage 119 is uncovered by the piston. As a result, communication is established from the electrode cylinder 35 back through the passage 56 and through the passage 120 to the exhaust passage 119. It follows, therefore, that the pressure in the electrode cylinder 35 drops to such an extent that the springs 43 and 45 act to return the piston assembly 39 toward its uppermost position. As soon as the piston assembly is moved upwardly by the springs, the exhaust relief valve A is opened and escape of the fluid pressure in the cylinder is facilitated. Inasmuch as the exhaust passage 119 communicates with the interior of the cylinder 101 through the rear end portion of the latter, it also follows that the fluid pressure in the accumulating chamber 125 and in the switch chambers 63, 68 is exhausted directly out of the cylinder 101 through the passage 119.

In order to illustrate more clearly the flexible nature of the welder, attention is directed to Figure 18. In this figure, I have shown a pressure curve wherein the ordinate indicates electrode pressures and the abscissa designates welding cycles. The electrodes contact with the work at 60 cycles and this time interval is controlled by the design of the valve 49. The peak pressure is reached at 147 cycles and the time required for the pressure to build up to this peak pressure is also controlled by the design of the valve 49. In this instance, the peak pressure is maintained for 12 cycles and this period is controlled by the needle valve 118. The pressure is dropped after an interval of 12 cycles duration by exhausting the fluid pressure and the electrodes are relatively moved out of engagement with the work at the point indicated on the curve.

The switch 61 may be operated to effect the weld at any point between the interval the electrodes engage the work and the interval the electrodes disengage the work. In Figure 18, I have shown various different points of application of the welding current during the pressure cycle. At A, I have shown the welding current applied at a relatively low pressure and at B, C, and D, I have shown the current as applied at different periods during the rise in pressure from zero to maximum. At E, I have shown the welding current as applied during the period peak pressure is maintained and at F and G, I have shown the current as applied during the interval the pressure drops. These latter examples are applicable to special instances only and are merely shown to illustrate the highly flexible nature of the welder. It may also be pointed out that the interval (a) the switch 61 operates to close the circuit is controlled by the adjustable stop 82 in conjunction with the needle valve 123, and the interval (b) the switch operates to open the circuit to the electrodes is controlled by the needle valve 126.

Thus, from the foregoing, it will be observed that I have provided a welding device wherein the rate of pressure rise in the electrode cylinder is definitely controlled so as to afford a sufficient time interval during the relatively low pressure periods to permit operation of the switch to effect the desired weld. It will also be observed that while the weld may be completed during the relatively low pressure periods, provision is made for exerting a comparatively high clamping pressure on the weld so as to insure effectively forging the weld. The forging pressure is applied to the weld after the latter has become sufficiently cooled to withstand this pressure and, in order to expedite the cooling operation, both electrodes may be artificially cooled. As shown in Figure 1, each of the electrode carrying arms 23 and 26 is provided with passages 130 arranged in such a manner as to permit the circulation of a cooling medium, such as water, in heat conducting relationship to the work engaging ends of the electrodes.

What I claim as my invention is:

1. In an electric welding apparatus, a pair of relatively movable electrodes cooperating with each other to clamp the work to be welded therebetween and arranged in an electric circuit, a switch in said circuit, fluid pressure actuated means for relatively moving the electrodes into engagement with the work, means controlling the pressure applied to the electrode moving means and operable upon engagement of the electrodes with the work to increase the pressure to a predetermined maximum value, and means controlled by the fluid pressure applied to the electrode moving means for operating the switch to successively close and open the circuit to the electrodes during the rise in pressure to said maximum value.

2. In an electric welding apparatus, a pair of relatively movable electrodes cooperating with each other to clamp the work to be welded therebetween and arranged in an electric circuit, a switch in said circuit operated by fluid pressure to close the circuit, a device operated by fluid pressure for relatively moving the electrodes into engagement with the work, means operated by said device for controlling the fluid pressure applied to the device, said control means operable subsequent to engagement of the electrodes with the work to increase the pressure applied to the device to a predetermined maximum value, and means also operated by said device to control the supply of fluid pressure to the switch and operable to successively close and open said circuit in timed relation to the application of said increased pressure on the electrode moving device.

3. In an electric welding apparatus, a pair of relatively movable electrodes cooperating with each other to clamp the work to be welded therebetween and arranged in an electric circuit, a switch in said circuit operated by fluid pressure to successively close and open said circuit, a member movable in one direction by fluid pressure and effective to relatively move the electrodes into engagement with the work under the action of the pressure of the fluid, a valve controlling the application of fluid pressure on said member and connected to said member for operation thereby to gradually increase the pressure from a predetermined minimum value to a predetermined maximum value, a second valve controlling the flow of fluid pressure to the switch and also connected to said member for actuation thereby to effect operation of the switch to close said circuit during the rise in pressure from said predetermined minimum value, and means for supplying fluid pressure to the switch and effective to operate the latter to open the circuit in timed relation to closing of said circuit.

4. In an electric welding apparatus, a pair of relatively movable electrodes cooperating with each other to clamp the work to be welded therebetween and arranged in an electric circuit, a switch in said circuit operated by fluid pressure to close the circuit, a device operated by fluid pressure for relatively moving the electrodes into engagement with the work, means operated by said device for controlling the rate of flow of fluid under pressure admitted to the device and operable upon engagement of the electrodes with the work to increase the rate of flow of fluid under pressure to the device to a predetermined maximum value, means also operated by said device to control the supply of fluid pressure to the switch and operable to successively close and open said switch in timed relation to the operation of said first named control means to increase the rate of flow of fluid under pressure to said device, means for regulating the operation of the second named pressure control means to vary the interval of closing of the switch with respect to the pressure applied to said device, and means for regulating the interval of opening the switch to provide welding periods of different lengths.

5. In an electric welding apparatus, a pair of relatively movable electrodes cooperating with each other to clamp the work to be welded therebetween and arranged in an electric circuit, a switch in said circuit operated by fluid pressure to successively close and open said circuit, a member movable in one direction by fluid pressure and effective to relatively move the electrodes into engagement with the work under the action of the pressure of the fluid, a valve controlling the application of fluid pressure on said member and connected to said member for operation thereby to gradually increase the pressure from a predetermined minimum value to a predetermined maximum value, a second valve controlling the flow of fluid pressure to the switch and also connected to said member for actuation thereby to effect operation of the switch to close said circuit during the rise in pressure from said predetermined minimum value, means for supplying fluid pressure to the switch to operate the latter to open the circuit in timed relation to closing of said circuit, an adjustable lost motion connection between the second valve and member to vary the interval of closing of the switch with respect to the pressure applied to said member, and adjustable means for controlling the flow of fluid pressure to the switch opening means to provide welding periods of different lengths.

6. In an electric welding apparatus, a pair of relatively movable electrodes cooperating with each other to clamp the work to be welded therebetween and arranged in an electric circuit, a switch in said circuit, fluid pressure actuated means for relatively moving the electrodes into engagement with the work, means controlling the pressure applied to the electrode moving means and operable upon engagement of the electrodes with the work to increase the pressure to a predetermined maximum value, means controlled by the fluid pressure applied to the electrode moving means for operating the switch to successively close and open the circuit to the electrodes during the rise in pressure to said maximum value, means for discontinuing the application of fluid pressure on said electrode moving means in timed relation to the period said maximum pressure is reached, and means for regulating the operation of said last named means to vary the interval between the application of the maximum pressure and the interval the latter pressure is discontinued.

7. In an electric welding apparatus, a pair of relatively movable electrodes engageable with the work to be welded, a cylinder communicating with a source of fluid under pressure, a piston reciprocably mounted in said cylinder and operatively connected to one of the electrodes for moving the latter into engagement with the work under the action of the fluid pressure admitted to the cylinder, a valve connected to said piston and operated by the latter to supply fluid pressure to the cylinder at different rates, said valve operable upon engagement of the electrodes with the work to increase the rate of flow of fluid under pressure to the cylinder, an electric circuit serving the electrodes, and a switch operable at a predetermined point in the rise in pressure in the cylinder to successively close and open said circuit.

8. In an electric welding apparatus, a pair of relatively movable electrodes engageable with the work to be welded, a cylinder communicating with a source of fluid under pressure, a piston reciprocably mounted in said cylinder and operatively connected to one of the electrodes for moving the latter into engagement with the work under the action of the fluid pressure admitted to the cylinder, means controlling the rate of flow of fluid under pressure to said cylinder and operable upon engagement of the electrodes with the work to increase the rate of flow of fluid under pressure to the cylinder, and electric circuit serving the electrodes, a switch in said circuit, means responsive to the pressure in the cylinder for actuating the switch to successively close and open said circuit, and means for regulating the switch actuating means to effect closing and opening of the circuit during a predetermined period in the interval the pressure in the cylinder increases to a predetermined maximum value.

9. In an electric welding apparatus, a pair of relatively movable electrodes engageable with the work to be welded, a cylinder communicating with a source of fluid under pressure, a piston reciprocably mounted in said cylinder and operatively connected to one of the electrodes for moving the latter into engagement with the work under the action of the fluid pressure admitted to the cylinder, means controlling the rate of flow of fluid under pressure to said cylinder and operable upon engagement of the electrodes with the work to increase the rate of flow of fluid under pressure to the cylinder, an electric circuit serving the electrodes, a switch in said circuit, means responsive to the pressure in the cylinder for actuating the switch to successively close and open said circuit, means for regulating the switch actuating means to effect closing and opening of the circuit during a predetermined period in the interval the pressure in the cylinder increases to a predetermined maximum value, and means for regulating the time interval between closing and opening of the switch to provide welding periods of different lengths.

10. In an electric welding apparatus, a pair of relatively movable electrodes engageable with the work to be welded, a cylinder communicating with a source of fluid under pressure, a piston reciprocably mounted in said cylinder and operatively connected to one of the electrodes for moving the latter into engagement with the work under the action of the fluid pressure admitted to the cylinder, a valve connected to said piston and operated by the latter to supply fluid pressure to the cylinder at different rates as said piston moves in a direction toward the work, an electric circuit serving the electrodes, a switch in said circuit operated by fluid pressure to successively close and open the circuit, and a second valve connected to the piston and operated by the latter to control the flow of fluid pressure to said switch.

11. In an electric welding apparatus, a pair of relatively movable electrodes engageable with the work to be welded, a cylinder communicating with a source of fluid under pressure, a piston reciprocably mounted in said cylinder and operatively connected to one of the electrodes for moving the latter into engagement with the work under the action of the fluid pressure admitted to the cylinder, a valve connected to said piston and operated by the latter to supply fluid pressure to the cylinder as said piston moves in a direction toward the work, an electric circuit serving the electrodes, a switch in said circuit operated by fluid pressure to successively close and open the circuit, a second valve controlling the flow of fluid pressure to the switch, means connecting the second valve to the piston for action by the latter to operate the switch to successively close and open the circuit to the electrodes in timed relation to movement of the piston under the influence of fluid pressure, means for regulating the interval of operation of the second valve by the piston to provide for closing and opening the switch at different periods in the interval the pressure increases in the cylinder from a predetermined minimum value to a predetermined maximum value, and means for regulating the time interval between closing and opening of the circuit by the switch.

12. In an electric welding apparatus, a pair of relatively movable electrodes engageable with the work to be welded, a cylinder communicating with a source of fluid under pressure, a piston reciprocably mounted in said cylinder and operatively connected to one of the electrodes for moving the latter into engagement with the work under the action of the fluid pressure admitted to the cylinder, a valve controlling the flow of fluid under pressure to the cylinder and operated by the piston subsequent to engagement of the electrodes with the work to increase the rate of flow of fluid under pressure to the cylinder, and means also controlled by said piston for closing an electric circuit to the electrodes in timed relation to the pressure rise in said cylinder.

13. In an electric welding apparatus, a pair of relatively movable electrodes engageable with the work to be welded, a source of fluid under pressure, a cylinder communicating with the source of fluid under pressure, a piston reciprocably mounted in the cylinder and operatively connected to one of the electrodes for moving the latter into engagement with the work under the influence of fluid under pressure admitted to the cylinder, a valve controlling the flow of fluid pressure to the cylinder and operated by the piston subsequent to engagement of the electrodes with the work to increase the rate of flow of fluid pressure to the cylinder, a second valve located between the source of fluid pressure supply and first valve operable to control the supply of fluid under pressure to the latter valve, an exhaust port controlled by the second valve and communicating with the cylinder, and fluid pressure means for operating the second valve to open the exhaust port in timed relation to movement of the electrode aforesaid into engagement with the work.

14. In an electric welding apparatus, a pair of relatively movable electrodes engageable with the work to be welded, a source of fluid under pressure, a cylinder communicating with the source of fluid under pressure, a piston reciprocably mounted in the cylinder and operatively connected to one of the electrodes for moving the latter into engagement with the work under the influence of the fluid under pressure admitted to the cylinder, a valve controlling the supply of fluid under pressure to the cylinder and operated by the piston subsequent to engagement of the electrodes with the work to increase the rate of flow of fluid pressure to the cylinder, an electric circuit serving the electrodes, a fluid pressure operated switch in the circuit responsive to movement of the piston in a direction to engage the electrode aforesaid with the work to successively close and open said circuit, a second valve located between the source of fluid pressure and first valve operable to supply fluid pressure to the latter valve, an exhaust port for both the cylinder and switch controlled by said second valve, and fluid pressure means for operating the second valve to exhaust the cylinder and switch in timed relation to movement of the electrode into engagement with the work.

15. In an electric welding apparatus, a pair of relatively movable electrodes engageable with the work to be welded, a source of fluid under pressure, a cylinder communicating with the source of fluid under pressure, a piston reciprocably mounted in the cylinder and operatively connected to one of the electrodes for moving the latter into engagement with the work under the influence of fluid under pressure admitted to the cylinder, a valve controlling the flow of fluid pressure to the cylinder and operated by the piston as the latter moves toward the work to supply fluid pressure to the cylinder, a second valve located between the source of fluid pressure supply and first valve operable to control the supply of fluid under pressure to the latter valve, an exhaust port controlled by the second valve and communicating with the cylinder, fluid pressure means for operating the second valve to open the exhaust port in timed relation to movement of the electrode aforesaid into engagement with the work, spring means acting on the piston to move the latter in a direction away from the work upon a drop in fluid pressure in the cylinder, and a pressure relief valve associated with the cylinder and operated upon movement of the piston under the action of the spring means to exhaust said cylinder.

16. In an electric welding apparatus, a pair of relatively movable electrodes engageable with the work to be welded, fluid pressure actuated means for moving one of the electrodes into engagement with the work, a valve operated by the electrode movable means and having provision for differentially controlling the fluid pressure acting on said movable means, said valve having a portion responsive to initial movement of the electrode toward the work to admit a substantial quantity of fluid under pressure to the electrode moving means to cause the said one electrode to approach the work at a relatively fast rate and having another portion for reducing the quantity of fluid admitted to the electrode moving means just prior to engagement of the said one electrode with the work to retard the rate of movement of the said one electrode and having still another portion responsive to engagement of the said one electrode with the work to gradually increase the rate of flow of fluid under pressure to the electrode moving means and thereby gradually increase the pressure to a predetermined maximum value.

17. In an electric welding apparatus, a pair of relatively movable electrodes engageable with the work to be welded, fluid pressure actuated means connected to one of the electrodes for movement of the latter into engagement with the work, a valve operated by the electrode moving means and having provision for differentially controlling the fluid pressure acting on the electrode moving means, said valve having a portion responsive to an initial movement of the said one electrode toward the work to admit a substantial quantity of fluid pressure to the electrode moving means to cause the said one electrode to approach the work at a relatively fast rate and having another portion for reducing the rate of flow of the fluid pressure just prior to contact of the said one electrode with the work to retard the rate of movement of the latter electrode and having still another portion responsive to engagement of the said one electrode with the work to gradually increase the rate of flow of fluid under pressure to the electrode moving means and thereby gradually increase the pressure to a predetermined maximum value, an electric circuit serving both the electrodes, a switch controlling said circuit, and means for closing and opening the switch at a predetermined point in the rise in pressure following engagement of the said one electrode with the work.

18. In an electric welding apparatus, a pair of relatively movable electrodes to be engageable with the work, a cylinder communicating with a source of fluid under pressure, a piston reciprocably mounted in said cylinder and operatively connected to one of the electrodes for moving the latter into engagement with the work under the action of the fluid pressure admitted to the cylinder, a valve operated by the piston and having provision for differentially controlling the fluid pressure admitted to the cylinder, said valve having a portion responsive to the initial movement of the said one electrode toward the work by the piston to admit fluid under pressure at a substantially fast rate in the cylinder and having another portion for retarding the rate of flow of fluid under pressure introduced into the cylinder just prior to engagement of the said one electrode with the work and having still another portion responsive to engagement of the said one electrode with the work to gradually increase the rate of flow of fluid under pressure to the cylinder and thereby increase the pressure applied to the work by the said one electrode to a predetermined maximum value, a switch in said circuit for closing the circuit and for opening the circuit in predetermined timed relation to closing of said circuit, and adjustable means operated by the piston for operating the switch to close the switch at different intervals in the rise in pressure following engagement of the said one electrode with the work.

19. In an electric welding apparatus, a pair of relatively movable electrodes engageable with the work to be welded, a cylinder having a head provided with a bore communicating with a source of fluid under pressure, a piston reciprocably mounted in said cylinder and operatively connected to one of the electrodes, a valve plunger reciprocably mounted in said bore and operatively connected to the piston for actuation by the latter, said valve plunger having axially spaced portions of different diameter cooperating with the bore to differentially control the flow of fluid pressure into the cylinder independence upon movement of the piston in a direction to engage the said one electrode with the work.

20. In an electric welding apparatus, an electrode movable into engagement with the work to be welded and arranged in an electric circuit, a switch in said circuit, fluid pressure actuated means for moving the electrode into engagement with the work, means for admitting fluid under pressure to the electrode moving means including a valve operable subsequent to engagement of the electrode with the work to vary the rate of flow of fluid under pressure to the electrode moving means, and means for operating the switch in timed relation to the operation of said valve to vary the rate of flow of fluid under pressure to the electrode moving means.

21. In an electric welding apparatus, an electrode movable into engagement with the work to be welded and arranged in an electric circuit, a switch in said circuit movable to its closed and open positions by fluid pressure, fluid pressure actuated means for moving the electrode into engagement with the work, means for admitting fluid under pressure to the electrode moving means including a valve operable subsequent to engagement of the electrode with the work to increase the rate of flow of fluid under pressure to the electrode moving means and thereby increase the pressure applied to the work by said electrode, and means for admitting fluid under pressure to the switch to successively close and open the switch in timed relation to the application of the increased pressure on the work by said electrode.

22. In an electric welding apparatus, an electrode movable into engagement with the work to be welded and arranged in an electric circuit, a switch in said circuit, fluid pressure actuated means for moving the electrode into engagement with the work, means for admitting fluid under pressure to the electrode moving means including a valve, means between the valve and electrode moving means for controlling the rate of flow of fluid under pressure to the electrode moving means, said control means being operable to increase the rate of flow of fluid under pressure to the electrode moving means subsequent to engagement of the electrode with the work and thereby increase the pressure applied to the work by said electrode, and means for successively closing and opening said switch in timed relation to the rise in pressure exerted on the work by said electrode.

HENRY THOMAS PLATZ.